Patented Feb. 7, 1950

2,496,265

UNITED STATES PATENT OFFICE 2,496,265

HYDROCARBON SYNTHESIS PROCESS

Julius P. Bilisoly, Baton Rouge, La., assignor to Standard Oil Development Company, a corporation of Delaware No Drawing. Application July 25, 1944, Serial No. 546,583

12 Claims. (Cl. 260—449.6)

The process of the present invention relates to the production of hydrocarbons from carbon monoxide and hydrogen in the present of a catalyst. This process is known as the Fischer-Tropsch synthesis.

The conventional Fischer-Tropsch synthesis is carried out using a catalyst such as a hydrogenating metal of the eighth group of the periodic system in combination with a promoter, usually a difficultly reducible metal oxide, in promotional amounts, and this mixture of metal and metal oxide is supported on a suitable carrier such as kieselguhr. The process has been carried out using various carriers such as, for example, charcoal, fuller's earth, glass wool, kaolin, pumice, silica gel, kieselguhr and a carrier having the trade name "Filter-Cel." These carriers are suitable for carrying out a Fischer-Tropsch synthesis where a bed type catalyst mass is employed and wherein the synthesis gas mixture of carbon monoxide and hydrogen is passed through the bed under suitable reaction conditions. However, these catalyst carriers, with the exception of silica gel, are not suitable for use in adapting the Fischer synthesis to a powdered catalyst or fluid catalyst technique wherein the catalyst mass is suspended in a gas stream and maintained therein under reaction conditions while effecting the reduction of carbon monoxide with hydrogen. Even with silica gel, the impregnation of the preformed dried gel with the desired metal and metal oxide does not produce a satisfactory catalyst for use in fluid catalyst operations.

The preparation of Fischer-Tropsch catalysts in the past has involved the preparation of aqueous solutions of water-soluble metal salts, the metals being of the eighth group of the periodic system, for example, iron, cobalt or nickel, and of the promoter salts, for example, of metals such as magnesium, thorium, cerium, and the like, which yield difficultly reducible metal oxides, in each case the salts being capable of thermal decomposition to the corresponding oxides. Thus, for example, cobalt nitrate in aqueous solution is admixed with thorium nitrate in aqueous solution and to this aqueous solution of mixed salts there is added sufficient ammonium, sodium or potassium carbonate to alkalize the same and precipitate the metals as the carbonates. To the slurry of precipitate in water there is added a suitable carrier such as one of the above-identified carriers. The mass is then filtered and dried at a temperature of about 212° F. until the moisture content shows between 6 and 10%. The carbonates deposited on these carriers are then subjected, under a temperature of from 700–900° F., to a stream of hydrogen to reduce the iron, cobalt or nickel carbonates to the corresponding metal, the promoter carbonates to the corresponding oxides, and the catalyst is then ready for use as a Fischer synthesis catalyst. It has been found, however, that a catalyst prepared in this manner is not suitable for use in the fluid-solid technique wherein the catalyst mass is suspended in a stream of reactant gases under reaction conditions for the reduction of carbon monoxide with hydrogen to produce normally liquid hydrocarbons. This catalyst is not suitable because of the fact that generally the carrier is much too friable and, in addition, the coating of iron, cobalt or nickel and the promoter, such as thorium oxide or magnesia, tends to flake off due to erosion and to attrition so that much of the catalytic effect of the carrier is lost due to the removal from the system of fines, these fines being mostly in the range of 0 to 20 microns in diameter. The density of particles of such size is not sufficiently great to afford suitable fluidizing characteristics to them, hence they must be removed from the system in order to maintain the remaining portion of the catalyst mass in suitable fluidized condition.

It is an object of the present invention to prepare suitable Fischer synthesis catalysts having improved attrition characteristics yet maintaining good activity and flexibility with regard to density. It is a further object of the invention to prepare Fischer synthesis catalysts tenaciously holding their catalytic components and to select the carriers and prepare the catalysts in a manner advantageous to an effective catalytic reduction of carbon monoxide with hydrogen. It is a further object of the invention to prepare a catalyst mass for fluidized technique involving powdered catalyst and a vapor phase reaction and to maintain catalytic activity throughout the life of the carrier, which is substantially unchanged in form so long as the catalyst remains active. It is a further object of the invention to employ silica gel as a carrier for Fischer synthesis catalysts while employing a rather wide range of densities without sacrificing good attrition characteristics. It is a further object of the invention to prepare a silica gel base Fischer synthesis catalyst such that when employed in a fluidized catalyst technique type of operation the essential ingredients of the catalyst, that is, the iron, cobalt or nickel, in combination with thoria, magnesia and the like, do not become separated from the carrier nor does the carrier become broken up or disintegrated through erosion or attrition during the reaction. It is a further object of the invention to minimize the production of fines of the order of 0 to 20 microns in diameter while employing the novel catalysts as Fischer synthesis catalysts in the reduction of carbon monoxide with hydrogen while employing the fluidized technique.

The reaction conditions for effecting the synthesis vary considerably, depending upon whether or not the catalyst in the reaction zone is in the form of a bed through which the gases pass or in the form of a fluidized suspension of solid catalyst particles maintained in a so-called "hindered settler" operation, said hindered settler serving as the reaction zone the effluent from which comprises reaction product and unreacted gaseous reactants substantially free of finely divided catalyst particles. In a solid bed type operation, the temperature is maintained at from 325° F. to 400° F., under pressure ranging from 1 to 25 atmospheres, with space velocities of from 75 to 400 v./v./hour. The fluidized operation employs a temperature of from 325° F. to 550° F., preferably 350° F. to 475° F., for the cobalt and nickel catalysts, with a temperature of from 375° F. to 700° F., preferably 475° F. to 625° F. for the iron catalyst. Space velocities may range between about 100 and about 3000 volumes of feed gas measured under standard conditions of temperature and pressure per volume of aerated suspended catalyst per hour, preferably between about 300 and about 1000 v./v./hr. The pressure may range from about 1 to about 35 atmospheres in both instances. The hydrogen to carbon monoxide molar ratio varies between 0.5:1 and 5:1, preferably between 1:1 and 3.5:1. For ordinary commercial operations, the hydrogen to carbon monoxide molar ratio is generally maintained at 2:1 or thereabouts. No further elaboration on the reaction conditions is believed to be necessary in view of the fact that these conditions are well known and the catalysts herein disclosed are operable under the reaction conditions heretofore customarily employed.

The catalysts suitable for use in a fluidized technique and capable of catalyzing the reduction of carbon monoxide with hydrogen are prepared in general as follows:

A silica hydrogel, which is sometimes referred to as a hydrous oxide of silicon in gelatinous or jelly form, is prepared by the reaction of an aqueous sodium silicate solution with sulfuric, hydrochloric or nitric acid. The resultant mixture is allowed to set to the gelatinous state. It is then washed to remove the water-soluble salts and is impregnated by soaking thereinto a mixed solution of the water-soluble salts of the hydrogenation type metals of the eighth group of the periodic system and the water-soluble salts of difficultly reducible metal oxides. Thus, for example, the iron, cobalt or nickel nitrates, the iron, cobalt or nickel acetates or chlorides, etc., and the thorium or magnesium, uranium, manganese, aluminum nitrates, acetates, chlorides, etc., are mixed in aqueous solution and taken up in the hydrous oxide of silicon in jelly form. The excess solutions are then drained therefrom and the precipitate or hydrogel is dried and heated at the lowest temperature necessary to effect decomposition of the metal salts. The material may then be ground to the desired particle size, that is of the approximate order of between 20 and 200 microns in diameter, and reduced by passing a stream of hydrogen thereover under temperatures between about 600° F. and about 800° F., using space velocities of between about 4000 and about 6000 v./v./hour.

Usually a complete reduction is effected in between about 1 hour and about 4 hours. The resultant catalyst mass may be pelleted and reduced after pelleting if a fixed bed type of operation is desired. Generally, however, the material is ground to the desired particle size to give the proper density for use in a fluidized technique of catalyst contact and then reduced in this powdered or finely divided condition.

A modification of the above procedure may also be employed to produce highly effective Fischer synthesis catalyst masses at the point in the above preparation where the hydrous oxide of silicon in jelly form has impregnated thereinto the water-soluble salts of metals of the eighth group of the periodic system and metals whose oxides are difficultly reducible, both salts being thermally decomposable to oxides. The separated gelatinous impregnated material may be so treated in the manner heretofore set forth, that is, by the addition in proper proportions of an aqueous solution of ammonium, sodium, or potassium carbonate to precipitate the metals of the eighth group of the periodic system and metals whose oxides are difficultly reducible in the form of their carbonates, so that the mixed metal carbonates are present in the gel carrier. This mass is then washed, dried and heated at a temperature of about 212° F. for a sufficient period of time to reduce the water content to between about 6 and about 10%, followed by the reduction and processing as before described. The resulting catalyst has been found to be highly efficacious in effecting the reduction of carbon monoxide with hydrogen to produce normally liquid hydrocarbons.

Still another method of preparation of the catalyst for use in fluid catalyst technique involving the reduction of the monoxide of carbon with hydrogen involves the initial preparation of the carrier base in more or less spherical particle sizes ranging from 5 microns to ½ inch diameter, depending upon the particular density to be employed in the fluidizing reaction of the Fischer synthesis. The spherical silica gel carrier base so prepared allows for high catalyst density and reduces the erosion of the equipment as well as provides a more active and stable catalyst generally having improved attrition characteristics. The catalyst carrier particles have essentially a spherical shape, allowing for more efficient washing, impregnating and treating in the preparation of the suitable catalyst masses. The catalysts containing these spherical particles as suitable carrier bases are prepared by admixing the aqueous sodium silicate and inorganic mineral acidification agent in the form of two separate solutions by means of a jet of restricted internal diameter whereby they are intimately mixed in forming the hydrosol. To the sol there is added a small volume of an emulsifying or wetting agent such as "Aerosol" (sodium salts of sulfonated succinic acid esters), "Alkaterge-O," lecithin, "Tween," (polyalkoxy ethylene oxide derivatives of fatty acid mono esters of sorbitol), etc., and this resultant mixture is passed through a second jet wherein the sol is emulsified in two to twenty times its volume of a wholly or partially immiscible substance such as the butyl alcohols, ether, naphtha, or light gas oil. The gel portion of the emulsion is then allowed to remain in a constant state of turbulence for a sufficient length of time to set the sol into the hydrogel or hydrous oxide of silicon in jelly form. The emulsification may be carried out at temperatures from room to 280° F., under pressures ranging from atmospheric to 50 pounds per square inch; and the hydrosol, in such an instance using 23° Bé. sulfuric acid as the acidification agent and 25° Bé. sodium silicate, will set in from 1 minute to 60 minutes depending upon the conditions employed. Various modifications of reactant concentration and temperature and pressure conditions may be employed. In addition to using the jet type of agitation to maintain the desired emulsion, propeller type agitators may be employed. The tiny particles of hydrogel which are essentially spherical in nature may be separated from the said immiscible substances by the addition of water after formation of the spheres. The water-gel mixture is withdrawn from the bottom of the separating vessel and conveyed to a washing step wherein the water-soluble salts formed in the preparation of the hydrous oxide of silicon are removed. This may be done concurrently or countercurrently, depending upon the economies of the particular apparatus. A continuous type filter may be employed for finally removing the solid hydrogel particles from the water or an ordinary filtering operation may be resorted to. The impregnation of the tiny spherical particles with the catalyst components may be proceeded with in the manner previously set forth. The resulting steps are identical with those previously described. The catalyst so produced is excellent for carrying out a fluidized powdered catalyst technique as applied to the Fischer synthesis because of the fact that preparation details such as concentration of solutions, drying technique, etc. can be varied to give the particular density of the catalyst ultimately desired, and further because the catalyst so produced has excellent attrition properties and is practically free from readily friable matter so that the effective components of the catalysts remain adhered to the carrier during the use of the preparation in a fluidized catalyst Fischer synthesis process.

A low density hydrous oxide of silicon in jelly form (sometimes less correctly known as "silica hydrogel") having an apparent density of 0.53 for the dried gel (when in a 4–12 mesh) was impregnated with aqueous solutions of the nitrates of cobalt and thorium in such proportions that the impregnated gel, after draining off the supernatant liquid, would contain 25% cobalt and 5% thorium. The impregnated gel was dried at about 212° F. and it was then heated at a temperature of about 420° F. for 24 hours in order to decompose the nitrates to the corresponding oxides. The dried impregnated material was then formed into ⅛" pills for further treatment. The pills were then charged to a reduction furnace and contacted with a stream of nitrogen while the temperature was raised to 650–700° F. When this temperature was reached, hydrogen replaced the nitrogen stream and was passed through the catalyst at a space velocity of about 5000 v./v./hour for about 4 hours while maintaining the temperature of 650–700° F. The apparent density of the reduced pills was about 0.90 gram per cc. or about 56.1 pound per cubic foot.

This catalyst was then tested for its attrition characteristics after first being ground to a highly comminuted condition to give particle sizes within the ranges desired for fluidized-solid catalyst operations. It is desirable usually to grind the material to a powder which contains less than 25% of material having a particle size of from 0 to 20 micron range diameter. This material was then studied to ascertain the tendency of the cobalt and thoria to become separated from the carrier material and actual operating conditions were simulated as closely as possible. The analyses were carried out with a view to determining not only the separation of the active constituents from the carrier but also to determine the amount of breakdown of larger particles into smaller sized particles due to rubbing of one particle against another. A Roller analyzer was employed for this purpose and consisted of blowing air through the Roller analyzer for a period of eight hours, the contents of the analyzer being the comminuted catalyst material. The analyzer is so constructed that it is possible to withdraw therefrom samples of the various sized particles and to analyze the same for their content of active constituents. In the case of the above catalyst, the following results were obtained:

| Micron range | 0-20 | 20-40 | 40-80 | 80 and higher |
|---|---|---|---|---|
| Percent cobalt | 23.8 | 21.9 | 21.7 | 21.8 |

At the end of the eight-hour period the amount of 0–20 micron material increased from 41.2% to 54.8%. It is obvious from these figures that there was very little concentration of cobalt in the fines from the attrition test and the catalyst was therefore satisfactory for use in fluidized-solid catalyst operations. An analogous distribution with respect to thoria content in about the same relative proportions also occurs. On a comparative basis, the data obtained using clay type carriers in place of silica gel showed a concentration or increase of fines from 33% to 49% during the eight-hour attrition test and with the following analysis for cobalt:

| Micron range | 0-20 | 20-40 | 40-80 | 80 and higher |
|---|---|---|---|---|
| Percent cobalt | 29.9 | 21.2 | 18.1 | 12.8 |

These data were obtained using a carrier of Attapulgus clay and it is evident that there was a pronounced concentration of cobalt in the fines resulting from the attrition test. A further comparable test was carried out using a catalyst whose carrier was raw bentonite type clay as the base, with the following results:

| Micron range | 0-20 | 20-40 | 40-80 | 80 and higher |
|---|---|---|---|---|
| Percent cobalt | 39.2 | 15.1 | 9.9 | 8.5 |

Here there was a marked increase in the amount of cobalt in the fines, that is, the material from 0–20 microns in diameter. There was also in the case of the bentonite carrier a marked increase in the amount of fines present.

*Example*

The silica gel catalyst above described was tested for its activity in promoting the Fischer synthesis of reducing carbon monoxide with hydrogen to produce normally liquid hydrocarbons using a feed stock having the following composition:

| | Per cent |
|---|---|
| $CO_2$ | 0.5 |
| Unsaturates | 0.2 |
| Oxygen | 0.3 |
| CO | 29.7 |
| Hydrogen | 60.1 |
| $CH_4$ | 2.2 |
| Nitrogen | 7.0 |

This feed stock was passed over a portion of the above catalyst, which had been reduced in the form of ⅛" pills and which had been transferred to the reactor under a blanket of nitrogen, at a temperature of between about 390° F. and about 400° F. and at a space velocity of about 100 v./v. hour. The amount of catalyst employed was about 100 cc. of the reduced pills. The products of the reaction were collected in a dry ice condenser and the run was carried out for a period of about six days while maintaining a temperature between about 390° F. and about 400° F. The maximum yield of liquid hydrocarbons obtained over a 24-hour period was about 170 cc. per cubic meter of synthesis gases computed as containing hydrogen and carbon monoxide in the ratio of 2:1 with no diluents and measured under standard temperature and pressure conditions. The average yield over the entire continuous six-day period was about 162 cc. per cubic meter.

The high resistance to attrition coupled with the high activity of the catalyst mass in catalyzing the reduction of carbon monoxide with hydrogen indicates an ideal catalyst for the reaction. Care in the conversion of the nitrates to the corresponding oxides is desirable and in fact necessary if high activity of the catalyst is to be obtained. Generally speaking, the catalyst should not be heated during the conversion to a temperature much above 475° F. In general, a temperature between about 400° F. and about 450° F. is most suitable. The novel catalyst was found to be much more active than was the case when wherely impregnating the dry silica gel with aqueous solutions of the nitrates followed by their conversion to oxides at temperatures of between about 800° and about 1000° F. and subsequent reduction. The impregnation of the hydrous oxide of silicon in jelly form produced a highly active catalyst of better quality than the catalyst prepared directly from dry silica gel as the initial carrier. In grinding the material for use in fluid-solid catalyst units or processes, it is desirable to limit the fines produced to less than 25% of the catalyst mass, preferably less than 15%.

Other methods of impregnating and forming the close association between the catalytic components of the catalyst and the silica gel carrier may be employed. Thus, for example, instead of using the hydrous oxide of silicon in jelly form, a mixture of hydrous oxides of silicon and aluminum in jelly form may be employed in one of two forms: Either the jelly form of the hydrous oxides of silicon and aluminum may be separately prepared and admixed or they may be co-setting gels to give the plural gels of hydrous silica and hydrous alumina. A further combination of the silica-alumina hydrous oxides in jelly form is prepared by first preparing the jelly form of hydrous oxide of silicon, washing the same and then impregnating or soaking it in a solution of a suitable aluminum salt, for example, an aluminum nitrate or sulfate or chloride, followed by the precipitation of the aluminum with ammonia solution and washing the same free of resulting salts. In these combinations of silica and alumina gels it is preferable to maintain the alumina in minor proportions. Indications have been that alumina gel alone is not a satisfactory carrier for the catalytic components, for although the attrition characteristics are good the catalytic activity is inferior.

Other proportions of the catalyic components on the silica carrier may be employed than those disclosed specifically hereinbefore. Thus the eighth group metal such as iron, cobalt or nickel, may vary between about 15 or about 40% while the difficultly reducible metal oxide such as thoria, magnesia, etc. may vary between about 2 and about 10%.

Having thus fully described and illustrated the nature of the invention, what is desired to be secured by Letters Patent is:

1. A process for the production of normally liquid hydrocarbons which comprises reacting carbon monoxide and hydrogen in the presence of a fluidized mass of subdivided catalyst comprising essentially a metal of the eighth group of the periodic system which is an active catalyst for the synthesis of liquid hydrocarbons and promotional amounts of a difficultly reducible metal oxide, both constituents being associated with a carrier comprising silica gel, said catalytic mass being formed by impregnating in aqueous solution a hydrous oxide of silicon in jelly form with a major portion of a water-soluble metal salt, wherein the metal is an active catalyst for the synthesis of liquid hydrocarbons and of the eighth group of the periodic system, and a minor portion of a water-soluble metal salt wherein the metal forms a difficultly reducible metal oxide, said salts being capable of thermal decomposition to metal oxides, draining and drying the resultant impregnated jelly, heating said jelly only sufficiently to convert the said difficultly reducible metal salt to the corresponding oxide, sizing the product to a fluidizable particle size and reducing the metal oxide of the eighth group to the free metal.

2. A process for the production of normally liquid hydrocarbons which comprises reacting carbon monoxide with hydrogen in the presence of a fluidized mass of subdivided catalyst comprising essentially a metal of the eighth group of the periodic system which is an active catalyst for the synthesis of liquid hydrocarbons and promotional amounts of a difficultly reducible metal oxide, both constituents being in association with a carrier comprising silica gel, said catalyst mass being formed by impregnating in aqueous solution a hydrous oxide of silicon in jelly form with a major portion of a water-soluble metal salt, wherein the metal is an active catalyst for the synthesis of liquid hydrocarbons and of the eighth group of the periodic system, and a minor portion of a water-soluble metal salt wherein the metal forms a difficultly reducible metal oxide, adding a water-soluble alkaline reacting carbonate to the said salt solution containing said impregnated jelly to convert the said metal salts to carbonates, filtering and draining the said jelly in suspension from the solution, washing and drying the said jelly, heating said dried jelly only sufficiently to reduce the water content to be between about 6 and about 10%, sizing the product to a fluidizable particle size and reducing the metal oxide of the eighth group of the periodic system to the free metal.

3. A process as in claim 1 wherein the silica gel is in the form of small spheres having fluid-like characteristics, the catalyst containing between about 15 and about 40% of the eighth group metal and between about 2 and about 10% of the difficultly reducible metal oxide.

4. A process as in claim 2 wherein the silica gel is in the form of small spheres having fluid-like characteristics, the catalyst containing between about 15 and about 40% of the eighth group metal and between about 2 and about 10% of the difficultly reducible metal oxide.

5. A process for the production of normally liquid hydrocarbons which comprises reacting carbon monoxide with hydrogen at a temperature between about 325° F. and about 550° F. in the presence of a fluidized mass of finely divided catalyst comprising essentially cobalt and a promotional amount of thoria, both constituents being in association with silica gel, said catalytic mass being formed by impregnating in aqueous solution a hydrous oxide of silicon in jelly form with a major portion of cobalt nitrate and a minor promotional amount of thorium nitrate, drying the resultant impregnated jelly, heating said jelly at a temperature below 475° F. to convert the metal nitrates to the corresponding metal oxides, sizing the product to a fluidizable particle size and reducing the cobalt oxide to cobalt with hydrogen at a temperature between about 600° F. and about 800° F.

6. A process for the production of normally liquid hydrocarbons which comprises reacting carbon monoxide with hydrogen at a temperature between about 325° F. and about 550° F. in the presence of a fluidized mass of finely divided catalyst comprising essentially cobalt and a promotional amount of thoria, both constituents being in association with silica gel, said catalytic mass being formed by impregnating in aqueous solution a hydrous oxide of silicon in jelly form with a major portion of cobalt nitrate and a minor portion of thorium nitrate, adding a water-soluble alkaline reacting carbonate to the said metal nitrate solutions containing said impregnated jelly to convert the said metal nitrates to the corresponding carbonates, filtering said jelly from the solution, washing and drying the said jelly, heating said dried jelly at a temperature below 212° F. to reduce the water content to between about 6 and about 10%, sizing the product to a fluidizable particle size and reducing the cobalt oxide to cobalt with hydrogen at a temperature between about 600° F. and about 800° F.

7. A process as in claim 5 wherein the silica gel is in the form of small spheres having fluid-like characteristics.

8. A process as in claim 6 wherein the silica gel is in the form of small spheres having fluid-like characteristics.

9. A process as in claim 5 wherein the catalyst contains between about 15 and about 40% of cobalt and between about 2 and about 10% of thoria, its apparent density in the reaction being between about 10 and about 35 pounds per cubic foot.

10. A process as in claim 6 wherein the catalyst contains between about 15 and about 40% of cobalt and between about 2 and about 10% of thoria, its apparent density in the reaction being between about 10 and about 35 pounds per cubic foot.

11. A process for the production of normally liquid hydrocarbons which comprises reacting carbon monoxide with hydrogen in the presence of a fluidized mass of subdivided catalyst comprising essentially a metal of the eighth group of the periodic system which is an active catalyst for the synthesis of liquid hydrocarbons and promotional amounts of a difficultly reducible metal oxide, both constituents being associated with a carrier comprising silica-alumina gel, said catalyst mass being formed by impregnating in aqueous solution mixed hydrous oxides of silicon and aluminum in jelly form with a major portion of a water-soluble metal salt, wherein the metal is an active catalyst for the synthesis of liquid hydrocarbons and of the eighth group of the periodic system, and a minor portion of a water-soluble metal salt wherein the metal forms a difficultly reducible metal oxide, said salts being capable of thermal decomposition to metal oxides, draining and drying the resultant impregnated jelly, heating said jelly only sufficiently to convert the said difficultly reducible metal salt to the corresponding oxide, sizing the product to a fluidizable particle size and reducing the metal oxide of the eighth group to the free metal.

12. A process for the production of normally liquid hydrocarbons which comprises reacting carbon monoxide with hydrogen in the presence of a fluidized mass of subdivided catalyst comprising essentially a metal of the eighth group of the periodic system, which is an active catalyst for the synthesis of liquid hydrocarbons and promotional amounts of a difficultly reducible metal oxide, both constituents being in association with a carrier comprising silica-alumina gel, said catalyst mass being formed by impregnating in aqueous solution hydrous oxides of silicon and aluminum in jelly form with a major portion of a water soluble metal salt, wherein the metal is an active catalyst for the synthesis of liquid hydrocarbons and of the eighth group of the periodic system, and a minor portion of a water-soluble metal salt wherein the metal forms a difficultly reducible metal oxide, said salts being capable of thermal decomposition to metal oxides, adding a water-soluble alkaline reacting carbonate to the said salt solution containing said impregnated jelly to convert the said metal salts to carbonates, filtering and draining the said jelly in suspension from the solution, washing and drying the said jelly, heating said dried jelly at 212° F. to reduce the water content to between about 6 and about 10%, sizing the product to a fluidizable particle size and reducing the metal oxide of the eighth group of the periodic system to the free metal.

JULIUS P. BILISOLY.

REFERENCES CITED

The following references are of record in the file of this patent:

UNITED STATES PATENTS

| Number | Name | Date |
| --- | --- | --- |
| 1,391,666 | Bosch | Sept. 27, 1921 |
| 1,695,666 | Schirmacher | Dec. 18, 1928 |
| 1,984,380 | Odell | Dec. 18, 1934 |
| 2,010,427 | Eversole | Aug. 6, 1935 |
| 2,281,919 | Connolly | May 5, 1942 |
| 2,347,682 | Gunness | May 2, 1944 |
| 2,352,416 | Thomas et al. | June 27, 1944 |
| 2,360,787 | Murphree | Oct. 17, 1944 |
| 2,384,942 | Marisic | Sept. 18, 1945 |
| 2,406,864 | Thomas | Sept. 3, 1946 |

FOREIGN PATENTS

| Number | Country | Date |
| --- | --- | --- |
| 396,712 | Great Britain | Aug. 8, 1933 |

OTHER REFERENCES

Berkmann: "Catalysis" (1940), pp. 460–461.